US009083822B1

(12) United States Patent
Basart et al.

(10) Patent No.: US 9,083,822 B1
(45) Date of Patent: Jul. 14, 2015

(54) SPEAKER POSITION IDENTIFICATION AND USER INTERFACE FOR ITS REPRESENTATION

(71) Applicant: ShoreTel, Inc., Sunnyvale, CA (US)

(72) Inventors: Edwin J. Basart, Los Altos, CA (US); David B. Rucinski, Red Bank, NJ (US)

(73) Assignee: Shoretel, Inc., Sunnyvale, CA (US)

( * ) Notice: Subject to any disclaimer, the term of this patent is extended or adjusted under 35 U.S.C. 154(b) by 104 days.

(21) Appl. No.: 13/672,675

(22) Filed: Nov. 8, 2012

Related U.S. Application Data

(63) Continuation of application No. 12/177,362, filed on Jul. 22, 2008, now Pat. No. 8,315,366.

(51) Int. Cl.
*H04M 1/56* (2006.01)
*H04M 15/06* (2006.01)
*H04M 1/57* (2006.01)

(52) U.S. Cl.
CPC .............. *H04M 15/06* (2013.01); *H04M 1/575* (2013.01)

(58) Field of Classification Search
USPC ................. 379/88.01, 88.02, 142.01, 142.06, 379/142.1, 142.17, 202.01, 205.01; 704/246, 250, 270, 275, 276
See application file for complete search history.

(56) References Cited

U.S. PATENT DOCUMENTS

| | | | |
|---|---|---|---|
| 6,192,395 B1 | 2/2001 | Lerner et al. | |
| 6,826,284 B1 | 11/2004 | Benesty et al. | |
| 6,882,971 B2 | 4/2005 | Craner | |
| 7,843,486 B1 | 11/2010 | Blair et al. | |
| 2004/0013252 A1* | 1/2004 | Craner | 379/142.01 |
| 2004/0076301 A1 | 4/2004 | Algazi et al. | |
| 2004/0125942 A1 | 7/2004 | Beaucoup et al. | |
| 2005/0049864 A1 | 3/2005 | Kaltenmeier et al. | |
| 2006/0132382 A1 | 6/2006 | Jannard | |
| 2007/0009120 A1 | 1/2007 | Algazi et al. | |
| 2007/0263823 A1 | 11/2007 | Jalava | |
| 2008/0056517 A1 | 3/2008 | Algazi et al. | |
| 2008/0057926 A1* | 3/2008 | Forstall et al. | 455/415 |
| 2008/0101624 A1 | 5/2008 | Schentrup et al. | |
| 2008/0103655 A1 | 5/2008 | Turnbull et al. | |
| 2009/0080632 A1 | 3/2009 | Zhang et al. | |
| 2009/0214052 A1 | 8/2009 | Liu et al. | |
| 2009/0220065 A1 | 9/2009 | Ahuja et al. | |
| 2009/0264114 A1 | 10/2009 | Virolainen et al. | |

OTHER PUBLICATIONS

International Search Report and Written Opinion, PCT Application No. PCT/US09/49101, Aug. 14, 2009, 15 pgs.

(Continued)

*Primary Examiner* — Yosef K Laekemariam
(74) *Attorney, Agent, or Firm* — Patent Law Works LLP

(57) ABSTRACT

A system, method and graphical user interface for determining a speaker's position and a generating a display showing the position of the speaker. In one embodiment, the system comprises a first speakerphone system and a second speakerphone system communicatively coupled to send and receive data. The speakerphone system comprises a display, an input device, a microphone array, a speaker, and a position processing module. The position processing module is coupled to receive acoustic signals from the microphone array. The position processing module uses these acoustic signals to determine a position of the speaker. The position information is then sent to other speakerphone system for presentation on the display.

22 Claims, 12 Drawing Sheets

(56) References Cited

OTHER PUBLICATIONS

"Diamondware :: Technology :: 3D positioning," Nortel, [online] [Retrieved on Oct. 22, 2008] Retrieved from the Internet <URL:http://www.dw.com/about_technology_3Dpositioning.php>, 2 pgs.

"Diamondware :: Always-On Conferencing," Nortel, [online] [Retrieved on Oct. 22, 2008] Retrieved from the Internet <URL:http://www.dw.com/about_technology_alwayson.php>, 3 pgs.

"PJP-300V(B) Video Conferencing System / IP Video Conference Codec," Yamaha Electronics Corporation, 2008, [online] [Retrieved on Oct. 22, 2008] Retrieved from the Internet <URL:http://www.yamaha.com/yec/products/productdetail.html?CNTID=556912&CTID=5040786>, 4 pgs.

"PJP-50R IP Audio Conference System Basic Operation Guide, Owner's Manual," Yamaha, Jan. 2007, 28 pgs.

"PJP-50R IP Audio Conference System," Yamaha Electronics Corporation, 2008, [online] [Retrieved on Oct. 22, 2008] Retrieved from the Internet <URL:http://www.yamaha.com/yec/products/productdetail.html?CNTID=555548&CTID=5040786, 5 pgs.

"PJP-25UR PC Conference Microphone Speaker," Yamaha Electronics Corporation, 2008, [online] [Retrieved on Oct. 22, 2008] Retrieved from the Internet <URL:http://www.yamaha.com/yec/prodeucts/productdetail.html?CNTID=5012842&CTID=5040786>, 7 pgs.

\* cited by examiner

SPEAKER POSITION IDENTIFICATION AND USER INTERFACE FOR ITS REPRESENTATION

CROSS-REFERENCE TO RELATED APPLICATIONS

The present application is a Continuation under 35 U.S.C. §120 of U.S. patent application Ser. No. 12/177,362 entitled "Speaker Identification and Representation for a Phone," filed on Jul. 22, 2008, the entire contents of which is incorporated by reference herein.

BACKGROUND

1. Field of the Invention

The present invention relates to telephony, specifically IP telephony. In particular, the present invention relates to a system and method for identifying a speaker on a call based on the location from which sounds originate.

2. Description of the Background Art

Participating in a conference call between two or more sites has become a common occurrence for many people. In many conference calls, at least one of the involved sites includes multiple participants using a speakerphone. During a conference call where at least a first site has multiple participants, it can often be difficult for a listener at another site to distinguish and identify which speaker is speaking. For example, the first site may include participants with similar sounding voices, participants who do not properly introduce themselves or simply a large number of participants. Regardless of the underlying cause, someone listening to a conference call often finds themselves wondering which remote participant is currently speaking, negatively detracting from the listener's ability to fully process the information being received.

The prior art has attempted to help listeners identify the active speaker in a conference call by a variety of methods. However, conventional systems require that each participant use a distinct audio input device (e.g., telephonic handset, headset, speakerphone, or microphone) throughout the conference call. In such situations, identifying which participant is the active speaker requires no more than identifying which audio input device is currently active. Conventional systems fail to provide reliable identification of the active speaker in a conference call when multiple participants share a single audio input device.

Thus, there is a need for providing those listening to a conference call with improved identification of the active speaker. Particularly, there is a need for providing those listening to a conference call with improved identification of the active speaker when multiple participants share a single audio input device.

SUMMARY OF THE INVENTION

The present invention is a system and method for determining a speaker's position and a generating a display showing the position of the speaker. In one embodiment, the system comprises a first speakerphone system and a second system communicatively coupled to send and receive data. The first speakerphone system comprises a display, an input device, a microphone array, a speaker, and a position processing module. The position processing module in the first speakerphone system is coupled to receive acoustic signals from a microphone array. The position processing module uses these acoustic signals to determine the position of the speaker. The position information is then sent to the second system for presentation on the display. The second system in various embodiments includes any type of endpoint including but not limited to a handset, a speaker phone a conference display or a computer. In one embodiment, the position processing module comprises an auto-detection module, a position analysis module, a tracking module and an identity matching module for the detection of sound, the determination of position and transmission of position information over the network. The position processing module comprises a position display module and a position translation module for receiving position information from the network and generating a user interface for display.

The present invention also includes a method for facilitating a call and determining speaker position and presenting position information. In some embodiments, the method includes receiving acoustic signals with a microphone array at a first site. The method further includes determining a position of a first speaker based on the received acoustic signals and transmitting position data describing the determined position of the first speaker to a second site. The method also includes presenting the determined position on a display at the second site based on the position data.

The present invention also includes a system for facilitating a call and determining speaker position and presenting position information. In some embodiments, the system includes a first phone system having a microphone array having a plurality of microphones, a position processing module and a transmitter for determining a position of a speaker based on acoustic signals received by the microphone array and outputting the determined position. The position processing module is coupled to the microphone array and the transmitter transmits position data describing the determined position of the speaker. The system further includes a second phone system having a display, a position display module and a receiver for receiving the determined position from the first phone system and presenting a user interface showing a representation of the determined position on the display. The receiver of the second phone system is adapted for communication with the first phone system and the position display module is adapted for communication with the receiver and the display.

The present invention also includes a graphical user interface. In some embodiments, the graphical user interface a call management display area including a plurality of partitions, each partition corresponds to a position around a phone system. The graphical user interface also includes at least one identifier, each identifier corresponding to a partition of the plurality of partitions. The graphical user interface further includes at least one position indicator icon, each position indicator icon corresponding to a corresponding identifier of the at least one identifier. In some embodiments, the position indicator icon shows an active speaker based on received position data indicating the active speaker.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
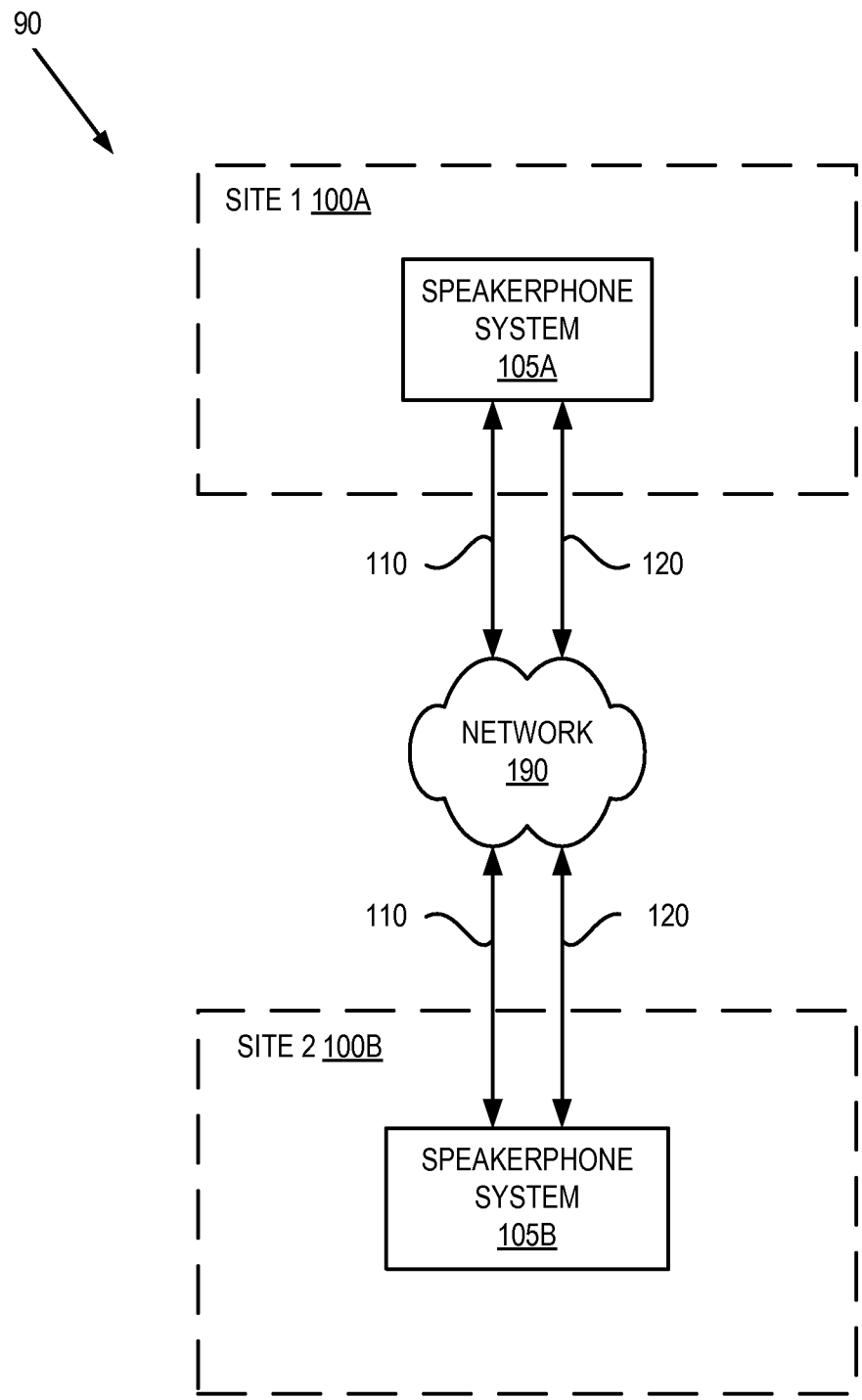
FIG. 1 is a block diagram of one embodiment of a telephony system including a speakerphone of the present invention.

A system and method for identifying participants in a conference call is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services. Furthermore, the system and method are described in the context of and IP telephony system, but may also be used an implemented in a conventional telephony system.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB drive with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

When multiple conference-call participants share a single audio input device, they typically maintain a relatively consistent physical position relative to the audio input device. For example, when using a speakerphone located on a conference table, participants typically remain seated in the same respective positions around the conference table throughout a conference call. The system of the present invention detects the physical position from which it receives sounds, and determines the position of the active speaker. This position information is transmitted and displayed to listeners at the other sites involved in the conference call, allowing the listeners to recall the identity of the active speaker. Additionally, the speakerphone associates an identity with each position around the conference table. In this case, listeners are explicitly given the identity of the active speaker in lieu of or in addition to information on the position of the active speaker. Ultimately, the system of the present invention with the ability to detect the relative physical position from which sounds originate provide improved identification of the active speaker in a conference call. In certain embodiments, the position information can be used to adjust the audio signal, for example, increase or decrease the audio level of an active speaker.

FIG. 1 illustrates a block diagram of a distributed telephony system 90 according to one embodiment of the present invention. The illustrated embodiment of the distributed telephony system 90 includes a first site 100A and a second site 100B. As used herein, a site represents a grouping of any combination of IP telephony resources such as a switch, server, IP phone, etc., even though only a speakerphone system 105A, 105B is shown at each site 100A, 100B. In the illustrated embodiment, the two sites 100A, 100B are communicatively coupled to a network 190 via signal lines 110, 120. One skilled in the art will note that sites 100A, 100B can be physically distinct from each other or merely topology-related groupings that are not in physically distinct locations. The distributed telephony system 90 of FIG. 1 is used only by way of example. While FIG. 1 illustrates two sites 100A, 100B, the present invention may readily be adapted to apply to any system architecture containing two or more sites.

The first site 100A includes a first speakerphone system 105A. In the illustrated embodiment, the first speakerphone system 105A is communicatively coupled to the network 190 by signal lines 110 and 120. The second site 100B similarly includes a second speakerphone system 105B. In the illustrated embodiment, the second speakerphone system 105B is similarly communicatively coupled to the network 190 by signal lines 110 and 120. Thus, the first speakerphone system 105A and the second speakerphone system 105B, and thereby the two sites 100A, 100B, are communicatively linked by the network 190. In the description that follows, the second speakerphone system 105B is used only by way of example, and in alternate embodiments is replaced by any type of IP telephony end point. In such alternate embodiments, the endpoint is able to display the position of speakers at the first site 100A since the position data is transmitted by the first speakerphone system 105A, however, those skilled in the art will recognize that the first speakerphone system 105A may not be able to display the position of speakers at the second site depending on whether the endpoint as the second site outputs position data.

In one embodiment of the present invention, the network 190 is a partially public or a wholly public network such as the Internet. The network 190 is preferably a wide area network. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

The capabilities of the first speakerphone system 105A include detecting the distance and direction from which sounds originate. Furthermore, in one embodiment, distance information is used by the speakerphone system 105 to increase the audio level (gain) on a more distant speaker. Adjustment of the audio level results in a better quality output at the receiving end as well as improving the accuracy of speaker identification Based on this information, the first speakerphone system 105A is capable of determining the physical position of an active speaker at the first site 100A during a call. The capabilities of the first speakerphone system 105A further include transmitting and receiving information via the network 190. Specifically, the first speakerphone system 105A is capable of transmitting audio data on signal line 110 and position and control data on signal line 120 to the network 190. Audio data includes any signals, preferably digital, necessary to transmit audible sounds detected by the first speakerphone system 105A in accordance with standard telephony techniques. Position and control data includes any signals, preferably digital, necessary to transmit information about the physical position of an active speaker at site 100A. Position and control data also includes any signals necessary to implement standard call set up and control features for governing a call within a distributed telephony system (such as multiplexing and routing data between multiple sites 100A, 100B, implement hold or call-waiting functions, etc.). While the audio data is described as being transmitted and received on signal line 110 and position and control data on signal line 120, those skilled in the art will recognize that in an alternate embodiment a single signal line could be used to transmit both sets of data.

The capabilities of the second speakerphone system 105B similarly include transmitting and receiving information over the network 190. Specifically, the second speakerphone system 105B is capable of receiving and sending any audio data on signal line 110 and position and control data on signal line 120 from and to the network 190. For example, the second speakerphone system 105B receives speaker position information from the first speakerphone system 105A about the locations of speakers at the first site 100A on signal line 120, and also sends information about speaker location for users at the second site 100B to the first speakerphone system 105A. The second speakerphone system 105B, based on the audio data received from the first speakerphone system 105A, generates sounds to recreate any audible sounds detected and transmitted by the first speakerphone system 105A in accordance with well-known telephone operation. In a similar fashion, the second speakerphone system 105B detects audio at its location, converts it to audio data and sends the audio data to the first speakerphone system 105A in accordance with well-known telephone operation. In one embodiment, the second speakerphone system 105B is additionally capable of interpreting position information included in the position and control data sent by the first speakerphone system 105. In some embodiments, a visual display is presented to the one or more listeners at the second site 100B based on the received information. In this way, the second speakerphone system 105B allows one or more listeners at site 100B to know the physical position and/or the identity of the active speaker at the first site 100A.

The above paragraphs, in an attempt to clearly illustrate the capabilities and interactions of the elements of the embodiment of FIG. 1, describe an interaction between a first speakerphone system 105A and a second speakerphone system 105B wherein the first speakerphone system 105A transmits information related to an active speaker at site 100A via the network 190 to the second speakerphone system 105B for presentation to one or more listeners at site 100B. It should be understood, however, that any features and capabilities described above as belonging to the first speakerphone system 105A are equally, but not required to be possessed by the second speakerphone system 105B. For example, system 105B may receive and display position information, but not transmit. System 105B may not have a speakerphone, but utilize a traditional handset. Similarly, any features and capabilities described above as belonging to the second speakerphone system 105B are equally possessed by the first speakerphone system 105A. As such, the preceding description related to the embodiment illustrated in FIG. 1 may readily be adapted to describe a scenario in which the second speakerphone system 105B transmits information related to an active speaker at site 100B via the network 190 to the first speakerphone system 105A for presentation to one or more listeners at site 100A.

For the purpose of illustrative clarity, the speakerphone systems 105A, 105B are depicted in the block diagram of FIG. 1 as single elements. However, one skilled in the art will appreciate that speakerphone systems 105A, 105B may be any device or collection of devices suitable for conducting a telephone call. For example, embodiments of a speakerphone system 105A, 105B may include a telephonic handset, a computing device executing a software application (e.g., a softphone), a standalone conference speakerphone, or a networked collection of telephonic and computing devices. Moreover, while FIG. 1 describes the invention in the context of two speaker phone systems 105A, 105B for convenience and ease of understanding, the present invention could be part of a conventional telephone that has a microphone array as will be described in more detail below with reference to FIG. 3.

Figure 2:
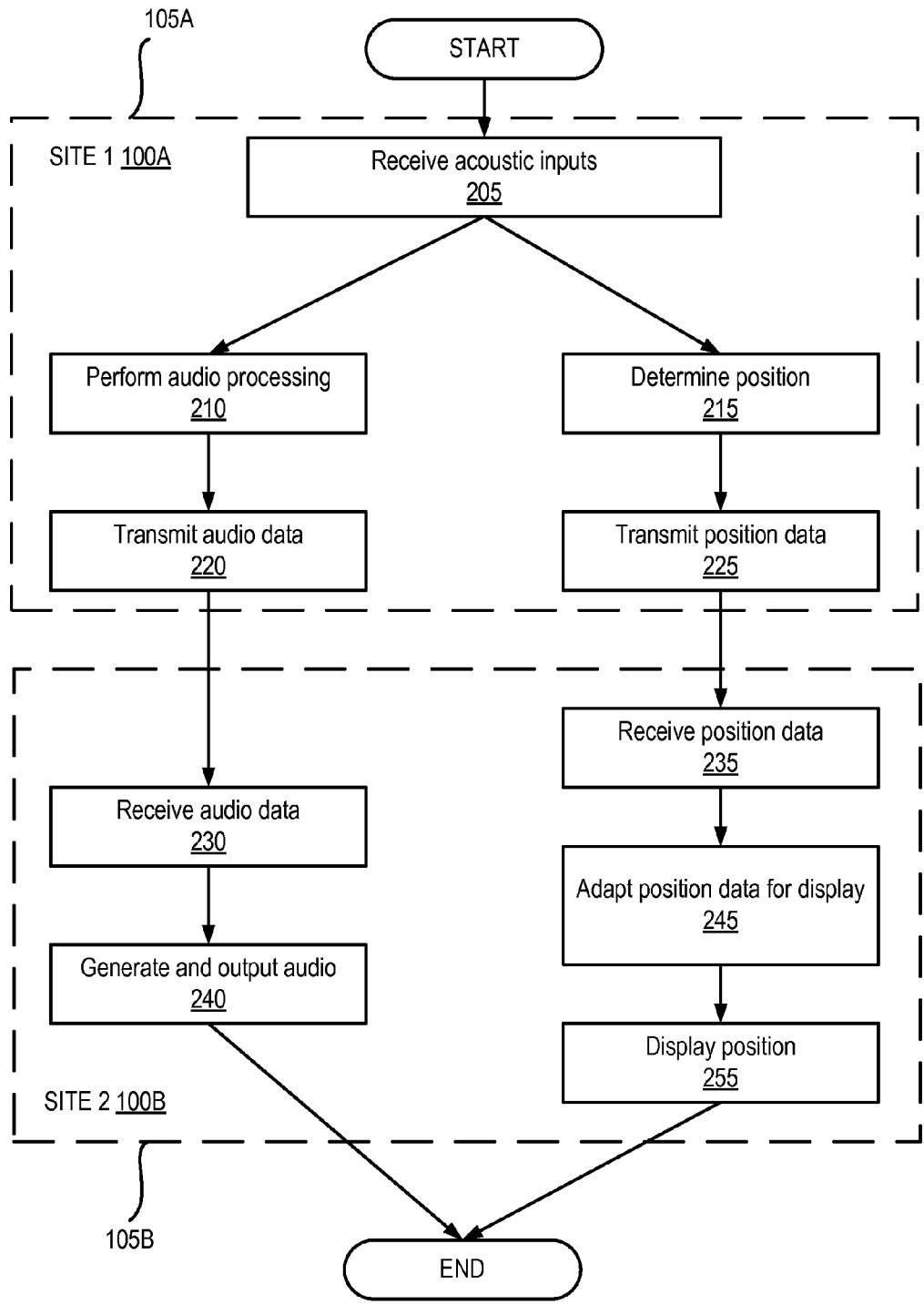
FIG. 2 is a flowchart of a method for determining speaker position and presenting position information in accordance with one embodiment of the present invention.

FIG. 2 presents a flowchart of a method for determining the position of an active speaker at the first site 100A and conveying that position to call participants listening at a second site 100B in accordance with one embodiment of the present invention. The first speakerphone system 105A located at the first site 100A receives 205 acoustic inputs. The acoustic inputs received 205 include the speech and other sounds from the active speaker (or others). The first speakerphone system 105A determines 215 the position of the active speaker based on the received acoustic inputs. Specifically, the first speakerphone system 105A detects the distance and direction from which the received acoustic inputs originated. Based on this information, the speakerphone system 105A determines 215 the physical position of the active speaker at the first site 100A. Once the active speaker's position has been determined 215, the first speakerphone system 105A transmits 225 position data to a second speakerphone system 105B located at the second site 100B. In one embodiment, the position data is transmitted 225 along with control data as part of a set of position and control data. In one embodiment, this transmission 225 occurs via the network 190 to which both the first speakerphone system 105A and the second speakerphone 105B are communicatively coupled.

The second speakerphone system 105B receives 235 the position data transmitted 225 by the first speakerphone system 105A and presents a corresponding display. A variety of displays may be employed at the second site 100B to convey the position of the active speaker at the first site 100A to users or listeners at the second site 100B. The second speakerphone system 105B adapts 245 the received 235 position data to the particular display being used at site 100B. In various embodiments of the present invention, the active speaker's position may be displayed 255 by a display device included within the second speakerphone system 105B or may be displayed 255 by a display device (e.g., a computer monitor, LED panel, etc.) to which the second speakerphone system 105B is communicatively coupled.

In the embodiment illustrated in FIG. 2, the second speakerphone system 105B is responsible for adapting 245 the position data to the display being used at the second site 100B.

In addition to the above-described steps related to conveying the physical position of an active speaker, the method illustrated in FIG. 2 also includes steps related to exchanging audio data between the first site 100A and the second site 100B in accordance with well-known telephony techniques. The first speakerphone system 105A performs 210 audio processing on the received 205 acoustic signals, which include the speech of the active speaker, and transmits 220 the resulting audio data to the second speakerphone system 105B via the network 190. The second speakerphone system 105B receives 230 the transmitted 220 audio data and generates and outputs 240 the audio for listeners at the second site 100B.

FIG. 2 illustrates the method in accordance with one embodiment of the present invention where the first speakerphone system 105A transmits 220, 225 information related to an active speaker at the first site 100A via the network 190 to a second speakerphone system 105B for presentation to listeners at a second site 100B. It should be understood, however, that the features and capabilities described above as belonging to the first speakerphone system 105A are included in the second speakerphone system 105B. Thus for this embodiment, the method illustrated in FIG. 2 may readily be adapted such that the second speakerphone system 105B transmits information related to an active speaker at the second site 100B via the network 190 to the first speakerphone system 105A for presentation to listeners at the first site 100A.

System Implementations

Figure 3:
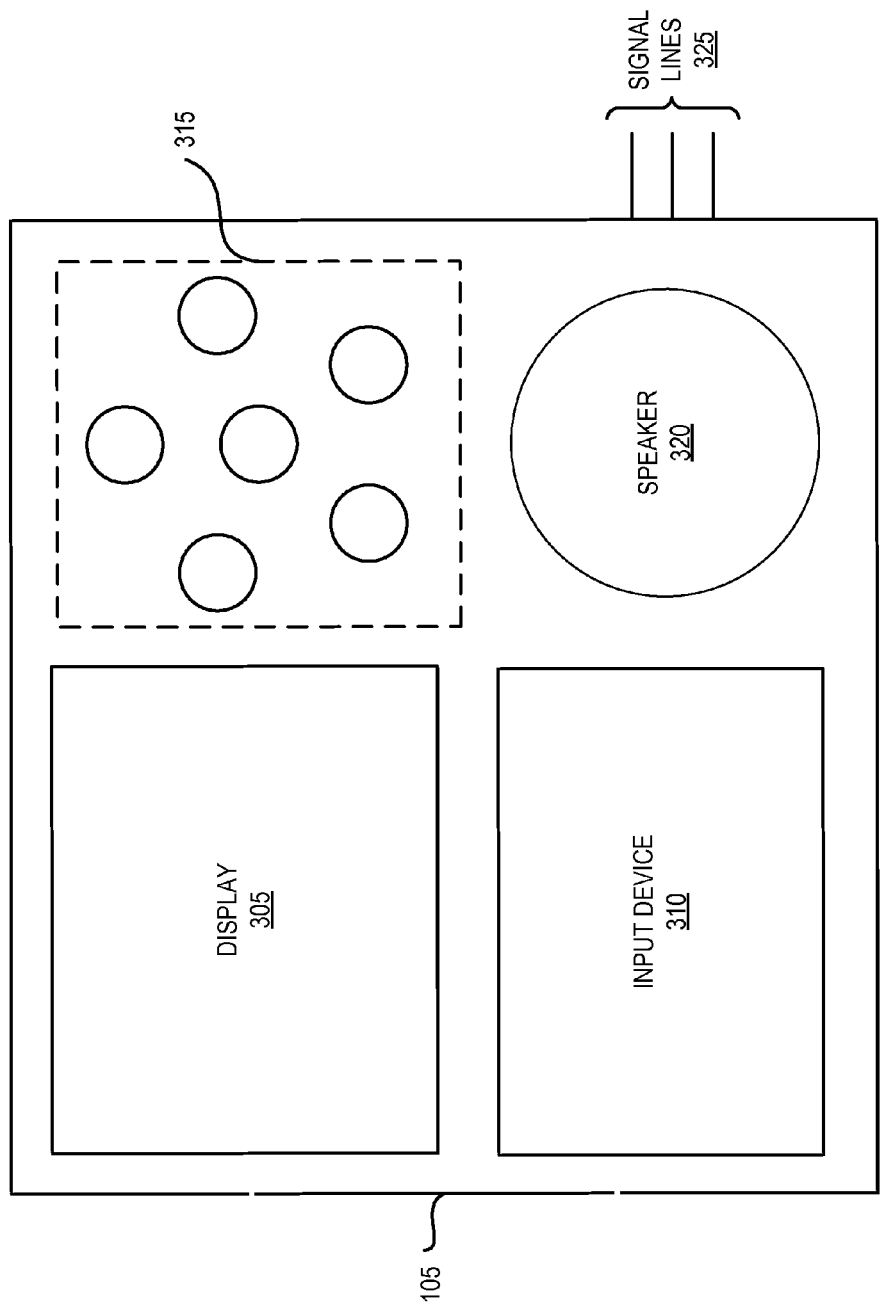
FIG. 3 is a block diagram of one embodiment of the speakerphone in accordance with the present invention.

FIG. 3 presents a plan view of a speakerphone system 105 in accordance with one embodiment of the present invention. In the embodiment illustrated by FIG. 3, the speakerphone system 105 includes a display 305, an input device 310, a microphone array 315, a speaker 320 and one or more signal lines 325. It should be understood that other embodiments of a speakerphone system 105 may include elements not explicitly depicted in the embodiment of FIG. 3 but will be described with reference to other figures.

The microphone array 315 is comprised of at least two microphones. The present invention advantageously receives sound from anywhere using the microphones and traces out the waveform from each microphone, and then using the fact that the waveform is time shifted between the two microphones constructs an angle indicative of the speaker's position. Such a microphone array 315 is sometimes referred to as a beam-forming microphone array. In one embodiment, the microphones of the beam-forming microphone array 315 exhibit high noise rejection and reverberation rejection, by isolating the desired sound of the speaker and eliminating noise and reverberation coming from other directions. The exact number of microphones included in the beam-forming microphone array 315 may vary depending upon the resolution of position desired. In general, the more microphones used in the microphone array 315 the greater the precision that an active speaker's position can be determined, and other sound elements rejected. In the embodiment illustrated by FIG. 3, the beam-forming microphone array 315 comprises six microphones. In one embodiment, the beam-forming microphone array 315 allows the speakerphone system 105 to determine the distance and direction from which sounds originate in accordance with the techniques described in U.S. Pat. No. 6,826,284 to Benesty et al, which is hereby incorporated in its entirety by reference.

The display 305 allows the speakerphone system 105 to convey the position of an active speaker at a remote site based on position data received from the remote speakerphone system (not shown). The display 305 may comprise an LCD screen or any other device suitable for conveying position information to a call participant using the speakerphone system 105.

The input device 310 allows the speakerphone system 105 to receive user input to govern its operation. The input device 310 may comprise a keypad, a touch-screen, voice recognition software, configurable soft-keys working in conjunction with the display 305, or any other device or collection of devices suitable for accepting input from a call participant using a speakerphone system 105. The speaker 320 allows the speakerphone system 105 to output audio.

The signal lines 325 are one or more data and/or control lines which serve to communicatively couple the speakerphone system 105 to other devices. For example, the signal lines 325 serve to couple the speakerphone system 105 to the network 190 and any other devices coupled to the network 190 and are for example and Ethernet connection. In an alternate embodiment, the signal lines 325 may include an analog or digital line to couple the speakerphone system 105 to other telephony or electronic devices over a PSTN network. Additionally, the signal lines 325 may include any variety of known computer networking cables which allow the speakerphone system 105 to interact with external devices such as personal computers or servers.

In some embodiments, the signal lines 325 allow the speakerphone system 105 to output information on an externally coupled display device (not show). For example, position and/or identity information may be displayed on the monitor of a laptop or desktop computer that is communicatively coupled to the speakerphone system 105 via one or more of the signal lines 325. Alternatively, position and/or identity information may be projected onto a viewing area by a projector that is communicatively coupled to the speakerphone system 105 via one or more of the signal lines 325.

Figure 4:
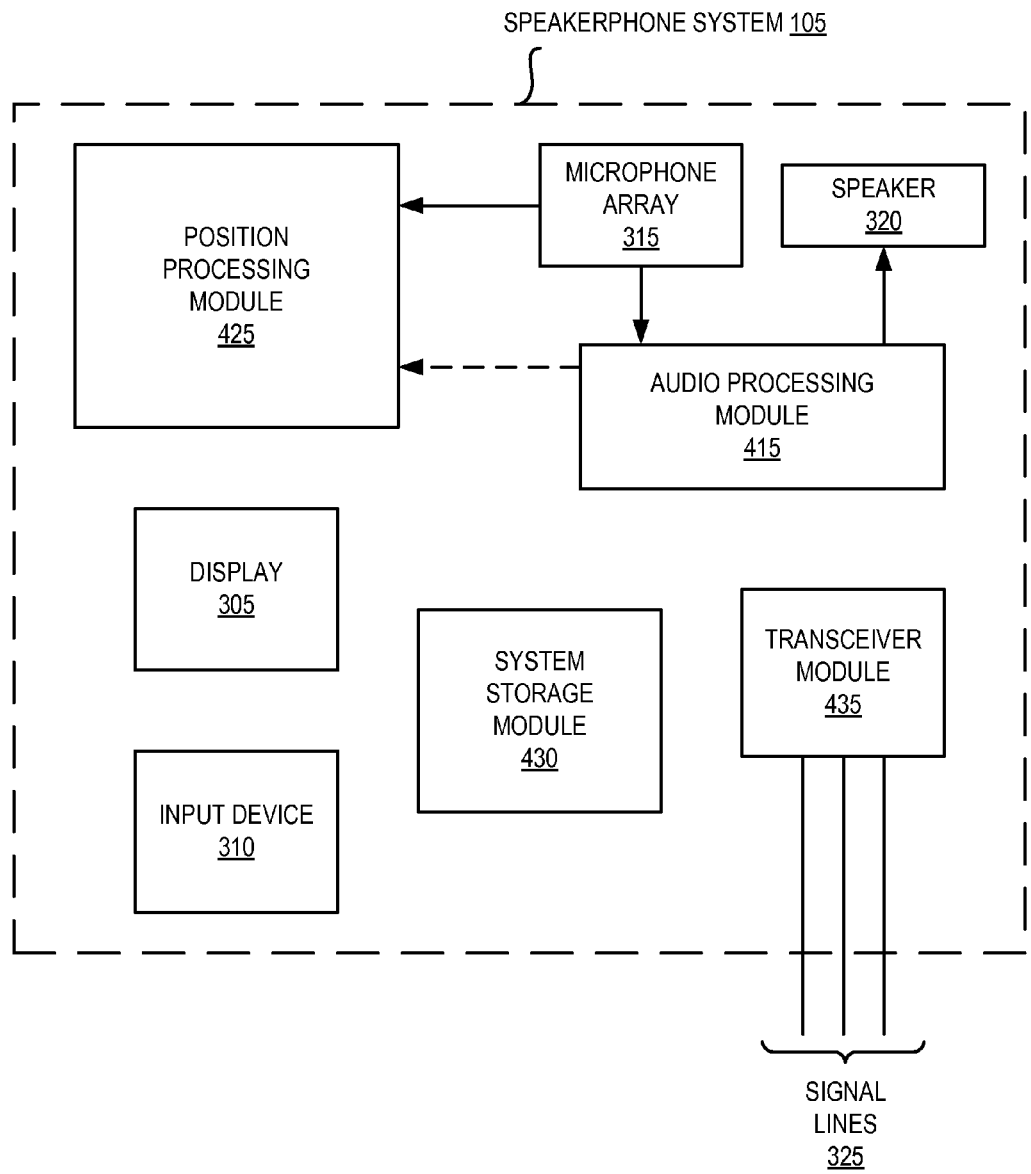
FIG. 4 is a block diagram of one embodiment of the speakerphone in accordance with the present invention.

Additional elements of the speakerphone system 105 in accordance with one embodiment of the present invention are depicted in FIG. 4. The speakerphone system 105 comprises the display 305, the input device 310, the microphone array 315, the speaker 320, an audio processing module 415, a position processing module 425, a system storage module 430, a transceiver module 435, and the one or more signal lines 325. In one embodiment, the display 305, the input device 310, the microphone array 315, the speaker 320, and the signal lines 325 depicted in FIG. 4 are the same as the display 305, the input device 310, the microphone array 315, the speaker 320, and the signal lines 325 described above in reference to FIG. 3.

The audio processing module 415, the position processing module 425 and the transceiver module 435 are one or more computer program elements executing on one or more processors. Additionally, the display 305, the input device 310, the audio processing module 415, the position processing module 425, the system storage module 430, and the transceiver module 435 are communicatively coupled to one another (connections not shown), at least to the extent that data may be passed between them.

The audio processing module 415 is communicatively coupled to both the microphone array 315 and the speaker 320. In accordance with standard telephony techniques, the audio processing module 415 receives acoustic inputs from the microphone array 315 and converts them into audio data suitable for transmission. In accordance with standard telephony techniques, the audio processing module 415 additionally converts audio data received from other remote telephonic device(s) to analog signals converted by the speaker 320 to acoustic output.

The position processing module 425 is communicatively coupled to the microphone array 315. The position processing module 425, based on acoustic inputs received by the microphone array 315, determines the position of an active speaker using the speakerphone system 105. The position processing module 425 generates position data which may be transmitted to one or more remote speakerphone systems 105. Additionally, the position processing module 425 handles tasks related to presenting position data received from one or more remote speakerphone systems 105. Further details on the operation of one embodiment of a position processing module 425 are detailed below with reference to FIG. 5.

The system storage module 430 comprises a computer readable storage medium such as, but not limited to, floppy disks, optical disks, CD-ROMs, magnetic optical disks, read-only memories (ROMs), random access memories (RAMs), flash memory, EPROMs, EEPROMs, magnetic or optical cards or any other type of media suitable for storing electronic instructions or data. The system storage module 430 allows the speakerphone system 105 to store any data necessary to support the functions described herein. For example, the identities or positions of previous active speakers, user-specified system configurations, contact information for business or personal contacts of a user or any other data useful to either the speakerphone system 105 or a user may be stored within the system storage module 430.

The transceiver module 435 is coupled to one or more signal lines 325. The transceiver module 435 enables the speakerphone system 105 to send and receive data over the network 190. The transceiver module 435 also enables the speakerphone system 105 to communicate with one or more external devices (not shown) as necessary to distribute tasks between the speakerphone system 105 and the one or more external devices. Those skilled in the art will recognize that, in some embodiments, any of the functionalities described in reference to FIG. 4 as being performed by the speakerphone system 105 may instead be performed by one or more suitable external devices communicatively coupled to the speakerphone system 105.

Figure 5:
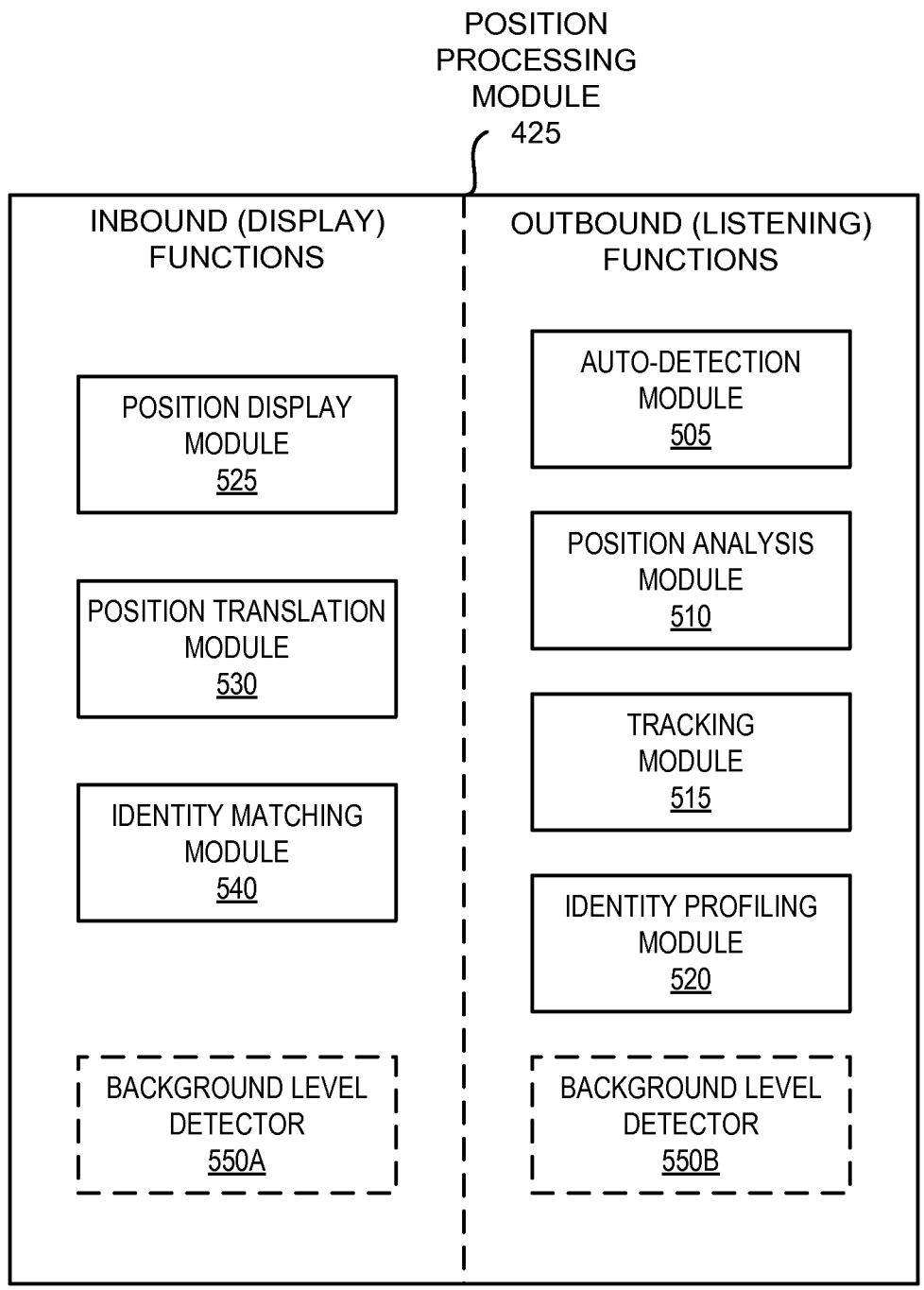
FIG. 5 is a block diagram of one embodiment of a position processing module in accordance with the present invention.

FIG. 5 illustrates a position processing module 425 in accordance with one embodiment of the present invention. Within FIG. 5, the elements of the position processing module 425 facilitate inbound (display) or outbound (listening) functions, as indicated by the dashed vertical line. Elements which facilitate outbound functions (the detection of sound or other input at the site and transmission of corresponding information over the network) include an auto-detection module 505, a position analysis module 510, a tracking module 515, an identity profiling module 520 and optionally a background level detector 550B. Elements which facilitate inbound functions (receiving position information from the network and generating an output, display or control signals) include a position display module 525, a position translation module 530, an identity matching module 520 and optionally a background level detector 550A. In one embodiment, the position processing module 425 advantageously minimizes network traffic. So when a speaker starts talking, the position analysis module 510, the tracking module 515, and identity matching module 520 sends/outputs the location and identity of the speaker over the network 190. When the speaker stops talking, the position analysis module 510, the tracking module 515, and identity matching module 52 sends nothing. These elements will only send something when a speaker changes in this embodiment.

The auto-detection module 505, the position analysis module 510, the tracking module 515, the identity matching module 520, the position translation module 530, and the position display module 525 are one or more computer program modules executing on one or more processors. Additionally, the auto-detection module 505, the position analysis module 510, the tracking module 515, the identity matching module 520, the position translation module 530, and the position display module 525 are communicatively coupled to one another for sending and receiving data and control signals.

In one embodiment, a position processing module 425 is able to initiate and adjust aspects of the operation of a speakerphone system 105 automatically. During a call, the auto-detection module 505 determines how many participants are sharing the speakerphone system 105 and automatically adjust its operation accordingly. For example, responsive to detecting that three participants are sharing the first speakerphone system 105, the auto-detection module 505 causes the speakerphone system 105 to take action (e.g., transmitting 225 corresponding position data). A receiving phone detects the new speaker and alters its display. During the call, a fourth participant begins using the speakerphone system 105. The position processing module 425 automatically detects this change and again takes action, transmitting the new speaker position data, causing each remote receiving display to ensure this change is reflected in its display 305. In one embodiment, any aspect of the operation of a speakerphone system 105 may be altered automatically in response to changing usage conditions. Functions related to detecting such changes in usage conditions and ensuring that appropriate responsive actions are automatically undertaken by the speakerphone system 105 are handled by the inbound functions, the position display module 525 and position translation module 530.

The position analysis module 510 determines the physical position of active speakers. In one embodiment, as described above, this may be accomplished by analyzing acoustic inputs received by a beam-forming microphone array 315 in accordance with the techniques described in U.S. Pat. No. 6,826,284 to Benesty, et al. The position processing module 425, using these techniques, determines the distance and direction from which sounds originate. From this distance and direction information, additional analysis determines the physical position, relative to the speakerphone system 105, of an active speaker. The position analysis module 510 is software or routines for analyzing the acoustic inputs received by the beam-forming microphone array 315 to determine the position of an active speaker.

In one embodiment, the tracking module 515 tracks an active speaker using the speakerphone system 105 as the active speaker changes position. As the active speaker moves, the position information displayed to remote listeners using remote speakerphone systems 105 may be updated accordingly by the auto-detection module 505. This is beneficial as participants sharing a speakerphone-system 105 may walk around or switch seats during a call. In one embodiment, a speakerphone system 105 employs elements of voice recognition to differentiate the voices of the participants into various voice profiles using the speakerphone system 105. In one embodiment, the speakerphone system 105 augments voice profile information with positional information provided by the position analysis module 510, thereby reducing performance requirements for the elements of voice recognition employed by the speakerphone system 105.

In one embodiment, the identity profiling module 520 saves profiles of different speakers and provides remote listeners with an associated identifier (e.g., an icon, image, or textual message by which the identity of the speaker is conveyed or mathematical signature). The identity profile of a speaker may not be an exact match with a saved profile due to limitations in the identity profiling module 520. The identity profiling module 520 transmits a profile when it matches exactly, and one or more possible matching profiles of the current speaker's profile and the one or more near matching profiles. This may be done by associating the identifier with a given position, as users of the speakerphone system 105 often occupy the same positions for multiple calls. Often, the speakerphone system 105 is utilized consistently by one or more participants in identical positions. Alternatively, a speakerphone system 105 may utilize elements of voice recognition and stored voice profile information to identify a speaker. In one embodiment, the identity profiling module 520 is software or routines for determining one or more profiles of an active speaker.

The identity matching module 540 is software and routines for receiving identity profiles and uses them along with other information to make a best match and one or more secondary matches. For example, in one embodiment, the speakerphone system 105 recognizes an IP address or a phone extension corresponding to the speakerphone system 105, and the identity matching module 540 uses this additional information along with position information to determine the identity of the speaker and associate an identifier. The speakerphone system 105 may store such information in the system storage module 430. Thus, the speakerphone system 105 may be able to predict the position and/or the identity of a remote participant by recognizing a particular remote speakerphone system 105 and retrieving associated stored data. In one embodiment, the identity matching module 540 is software or routines for determining the identity of an active speaker. For example, the identity matching module 540 may have stored profiles of a large number of speakers from an address book. The phone may collect profiles and the user may assign those profiles to an address book. Then when an identity profile is received, but is not a perfect match with a current speaker in the call, the identity matching module 540 uses profiles from previous calls that have been matched to speaker identities.

The position display module 525 receives position data regarding a remote speaker from other speakerphone systems 105 to which it is communicatively coupled. In one embodiment, the position display module 525 thereafter adapts the received position data for display to one or more calls participants using the speakerphone system 105. This is beneficial as different embodiments of the present invention may use different user interfaces. Thus, adapting the position data to the particular user interface of the speakerphone system 105 allows calls to be held between different end points without sacrificing functional capabilities. Additionally, the single speakerphone system 105 supports multiple graphical representations of an active speaker's position and a user is able to choose a preferred graphical representation. In such an embodiment, the user may do so by making selections using the input device 310. Any position data may be adapted to the user-selected graphical representation by the position display module 525.

In some embodiments, one or more external devices may be coupled to the speakerphone system 105 via one or more data lines 325. Thus, position information regarding a remote speaker may be presented using the display of one or more communicatively coupled external devices. Additionally, the external device may be located somewhere within the network 190 to which the speakerphone system 105 is coupled. In order to utilize the display of an external device, position data received may require translation to be compatible with the display of the external device. The position translation module 530 translates position data to facilitate its display of position information on the external device.

In accordance with other embodiments, the present invention includes a background level detector 550A, 550B. The background level detectors 550A, 550B are shown with dashed lines in FIG. 5 to indicate that they represent alternate embodiments, and that only a single background level detector 550A, 550B is needed, as part of either the inbound functions or the outbound functions. In a first embodiment, the background level detector 550A is configured to cooperate with display elements such as the position display module 525, the position translation module 530 and the identity matching module 540. The background level detector 550A monitors the audio received to determine when the speaker is talking (or otherwise making noise). Thus if the display is animated or fluctuating to indicate that a speaker is speaking, it will not animate erroneously when there is background noise and the speaker is not speaking. For example, the background level detector 550A sets a threshold for received audio, and whenever sound passes that threshold, the background level detector 550B determines that it's the speaker speaking. The background level detector 550A continuously adjusts the threshold to ensure that the audio signal is not noise. This first embodiment of the background level detector 550A is advantageous because it reduces the traffic over the network. In yet another embodiment, either background level detector 550A or 550B (or in other embodiments other components of the position processing module 425) can be used to identify know noise sources, such as projectors and block them from a call. For example, when the speakerphone system 105A hears a speaker and identifies it, a user on either the listening speakerphone system 105A or the displaying speakerphone system 105B can mark the identified "noise source" with an identify such as "identity=projector." Once identified, the noise can be filtered out of the audio portion of the call by either the listening speakerphone system 105A or the displaying speakerphone system 105B. It is advantageous for the listening speakerphone system 105A to block speakers identified as noise and not transmit to the display end of the call to reduce network traffic.

In a second embodiment, the background level detector 550B is configured to cooperate with listening elements such as the auto-detection module 505, the position analysis module 510, the tracking module 515 and the identity profiling module 520. In this second embodiment, the background level detector 550B monitors the audio received to determine when the speaker is talking (or otherwise making noise). For example, the background level detector 550B sets a threshold for received audio, and whenever sound passes that threshold, the background level detector 550B determines that it's the speaker speaking and sends a signal over the network 190 indicating the background noise level. This background noise level signal can be used by the position display module 525 along with other position information to determine the active speaker and changes in the active speaker. Since there may be background noise above the threshold, the background level detector 550B changes the threshold depending upon background noise. For example, the background level detector 550B continuously adjusts the threshold. Furthermore, the second embodiment of the background level detector 550B can send signals indicating a fluctuation above the threshold is noise. For example, where someone drops a pencil on the table, and that sound is not intended to be a change in the active speaker. In such a case, the background level detector 550B sends a signal speaker (position, identity=noise), and the receiving end (the position display module 525 and the identity matching module 540 do not fluctuate until the noise stops. Then the position analysis module 510 and the identity profiling module 520 transmit the speaker position and identify when the speaker starts again.

Conveying Position Information

During a call, a participant using the speakerphone system 105 to listen to a remote speaker is presented with information regarding the physical position of the remote speaker. In one embodiment, position information is presented via a graphical user interface 615A shown on the display 305 that is part of a speakerphone system 105. In another embodiment, the graphical user interface 615A is presented on the display of an external device that is communicatively coupled to a speakerphone system 105. Numerous embodiments of a user interface 615 conveying an active speaker's position are possible. Referring now to FIGS. 6-12B, example user interfaces 615A-615 F for presenting position information related to one or more remote sites are illustrated.

Figure 6:
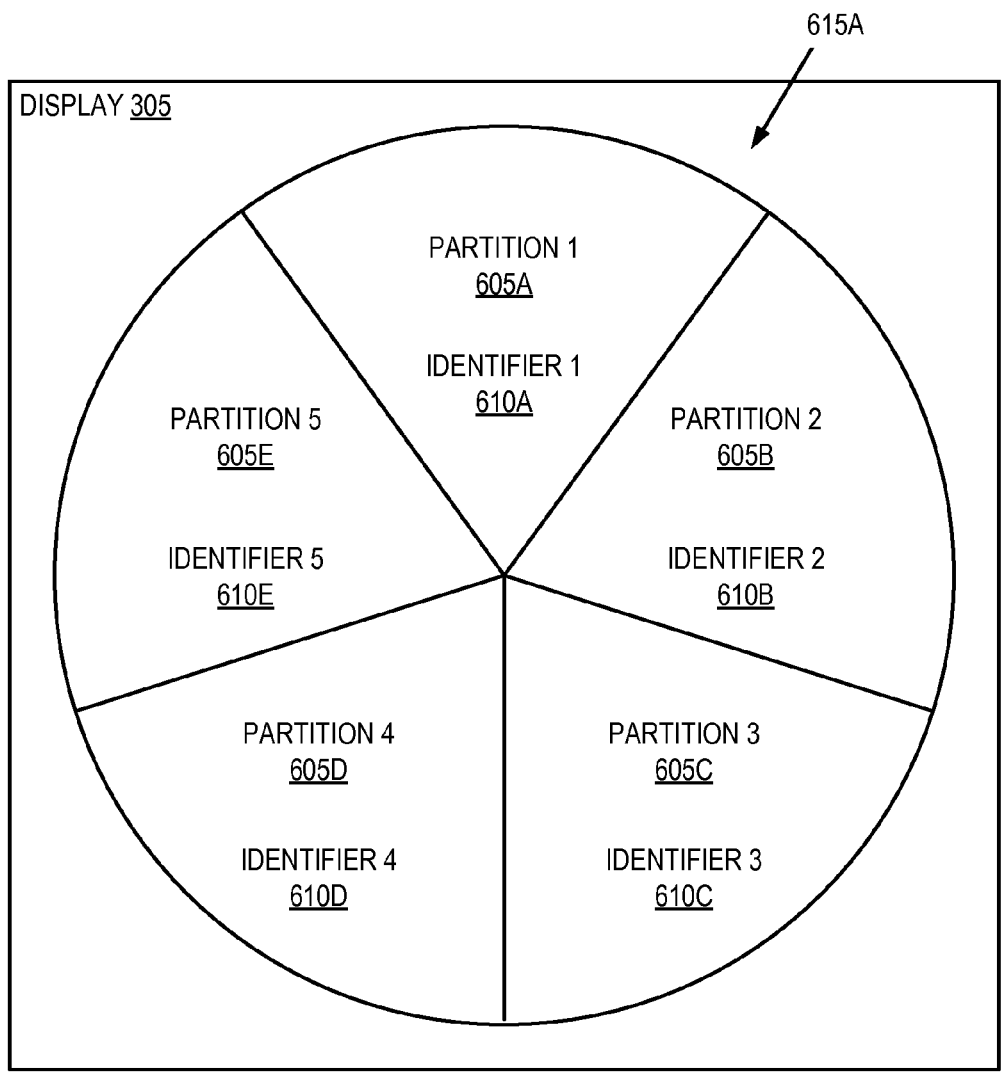
FIG. 6 is a graphical representation of one embodiment of a user interface showing position information in accordance with the present invention.

FIG. 6 illustrates a sample user interface 615A is illustrated. In the user interface 615A, a circle is divided into multiple partitions 605A-605E, with each partition 605A-605E corresponding to a physical position around a first speakerphone system 105A, whose location would correspond to the center of the circle. The partitions 605A-605E may change in physical appearance to reflect the present position of an active speaker using a remote speakerphone system 105. For example, partition 1 605A is shown in a visually distinct matter (bright, highlighted, different color, shades, hatched, etc.) relative to the other partitions 605B-605E while a first remote participant corresponding to that physical position is the active speaker. Should a second remote participant with a physical position corresponding to partition 2 605B become the active speaker, partition 1 605A may dim and partition 2 605B may brighten relative to the other partitions 605A, 605C-605E. In addition to reflecting the position of a remote active speaker by relatively brightening and dimming partitions 605, partitions 605 may reflect the position of the remote active speaker via color changes. Additionally, a partition 605 may blink or fluctuate in color in response to periods of speech and silence during the time the corresponding remote participant remains the active speaker. In one embodiment, the user interface 615A also allows the user to enter a user's name to replace the identifier 610A-610E if there is no known match, and the speakerphone system 105 can save the identifier profile along with the name for use in future calls.

In the embodiment illustrated by FIG. 6, five partitions 605A-605E are present. Other embodiments of the user interface 615A may include any number of partitions 605 corresponding to the capabilities of the beam-forming microphone array 315 of the speakerphone system 105. In one embodiment, five partitions 605 are present because a speakerphone system 105 has detected that five remote participants are present. The user interface 615A is updated automatically as a result of actions taken by the auto-detection module 505 and the position display module 525. In one embodiment, five partitions 605 are used because a remote speakerphone system 105 is configured by default to divide its surroundings into five physical positions regardless of how many remote participants are present, perhaps based on characteristics of its microphone array 315. In such an embodiment, the physical position of the active speaker may still be beneficially conveyed by the corresponding partition 605, but there may not necessarily be a one-to-one correlation between partitions 605 and remote participants.

In one embodiment, an identifier 610A-610E is displayed in or near the partition 605A-605E corresponding to a remote active speaker. An identifier 610A-610E comprises an icon, image or textual message by which the identity of an active speaker is conveyed. The identifier 610A-610E may be autonomously determined by the speakerphone system 105 or may be based on information provided by participants of a call. In one embodiment, participants may identity themselves or others and their respective positions before or during a call.

Figure 7:
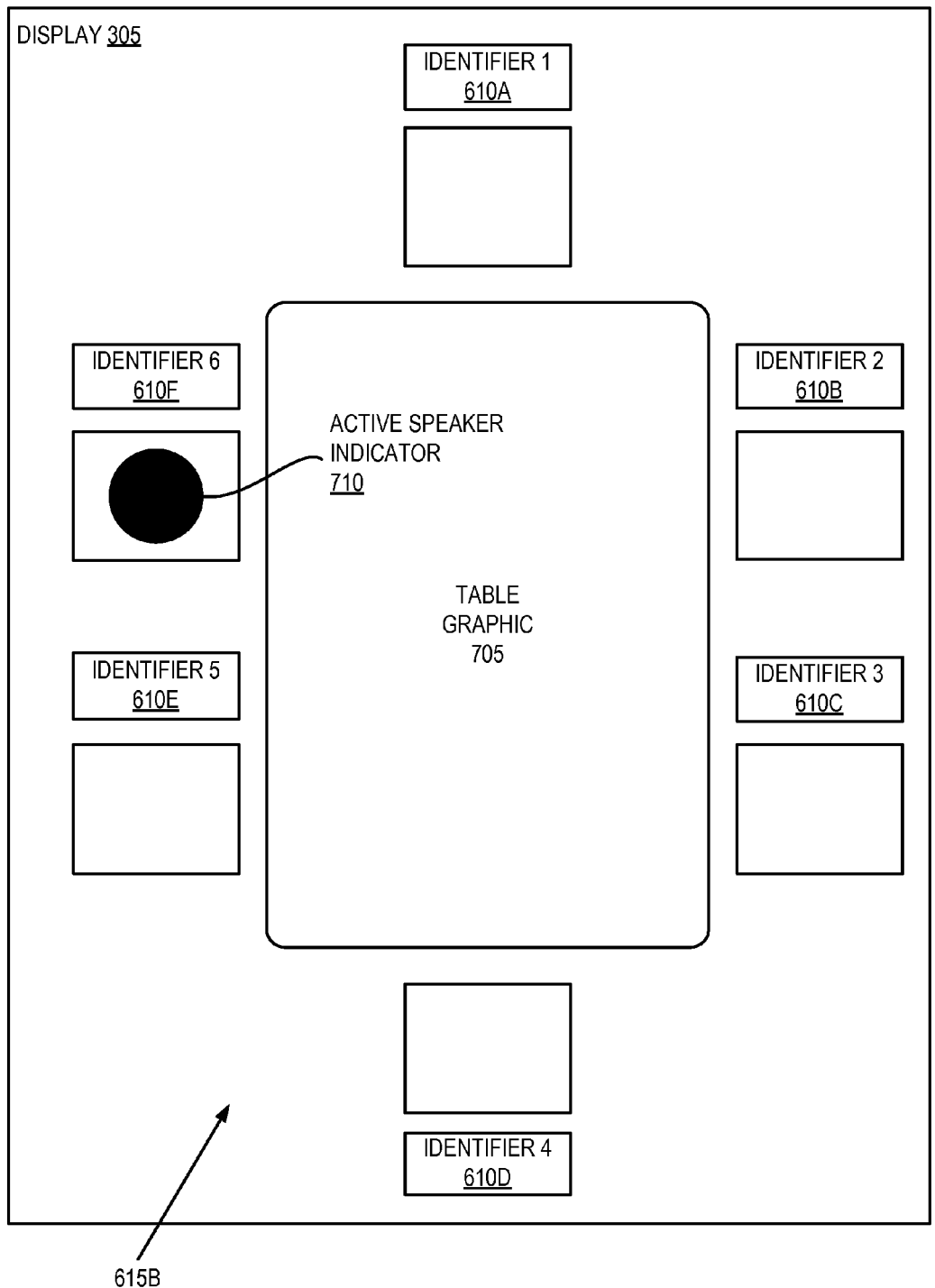
FIG. 7 is a graphical representation of a second embodiment of a user interface showing position information in accordance with the present invention.

Referring now to FIG. 7, a second sample user interface 615B is illustrated. The user interface 615B may be thought of as a plan view of a conference table around which participants on a call are seated. In the user interface 615B, a table graphic 705 is presented near the center of the user interface 615B. In different embodiments, the table graphic 705 may take on non-rectangular shapes (e.g., a circle corresponding to a circular conference table). An active speaker indicator 710 conveys to participants the position of a remote speaker that is active by occupying one of one or more positions around the table graphic 705 and highlighting it with black shading. The active speaker indicator 710 may change positions when a different remote participant speaks. Additionally, the active speaker indicator 710 may blink or fluctuate in color in response to periods of speech and silence during the time a corresponding remote participant is the active speaker. Although FIG. 7 shows the speaker positions as being about the periphery of the table graphic 705, those skilled in the art will recognize that the speaker can be identified in various locations in user interface 615B such as between behind and between speakers near the table graphic 705.

In the embodiment illustrated by FIG. 7, six positions surround the table graphic 705. Other embodiments of the user interface 615B include any number of positions within the capabilities of the beam-forming microphone array 315 of a speakerphone system 105 from 2 to n. In one embodiment, the six positions surround the table graphic 705 because the speakerphone system 105 has detected that six remote participants are present. The user interface 615B is updated automatically as a result of actions taken by the auto-detection module 505 and the position display module 525. In one embodiment, six positions surround the table graphic 705 because the remote speakerphone system 105 is configured to divide its surroundings into six physical positions regardless of how many remote participants are present, perhaps based on characteristics of its microphone array 315. In such an embodiment, the physical position of the active speaker is still be conveyed by the active speaker indicator 710, but there is not necessarily be a one-to-one correlation between partitions 605 and remote participants.

In one embodiment, the identifier 610 is displayed in or near the position corresponding to a remote active speaker. The identifier 610 comprises an icon, image, or textual message by which the identity of an active speaker is conveyed. In one embodiment, the identifier 610 is autonomously determined by a speakerphone system 105 or is based on information provided by participants of a conference call. In one embodiment, the participants identity themselves or others and their respective positions before or during a conference call. In another embodiment, the positions are assigned by default.

In yet another embodiment of the present invention, positions surrounding the table graphic 705 are not explicitly presented and predefined. Rather, an active speaker indicator 710, potentially alongside the identifier 610, appears anywhere within the user interface 615B to indicate the physical position of a remote active speaker.

Figure 8:
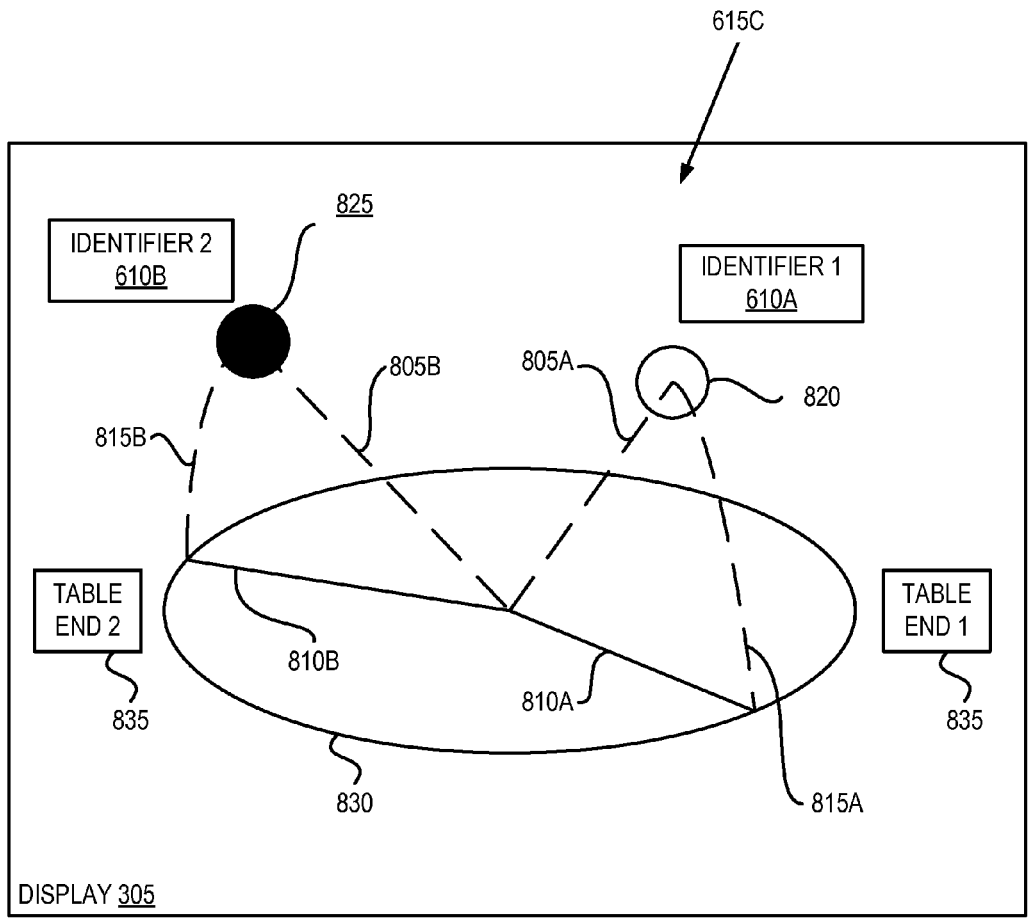
FIG. 8 is a graphical representation of a third embodiment of a user interface showing position information in accordance with the present invention.

Referring now to FIG. 8, a third sample user interface 615C is illustrated. The user interface 615C conveys the position of a remote active speaker in three-dimensional ("3D") space. When acoustic inputs are received by the beam-forming microphone array 315, the position processing module 425 determines the distance and direction from which the acoustic inputs originated and the position of the remote active speaker in 3D space. In the user interface 615C, the 3D position of an active speaker (speaker B) is conveyed by graphical elements, including active speaker indicator 825, an azimuth indicator 805B, an angle indicator 810B, and an azimuth linker 815B. Additional graphical elements may be present within the user interface 615C to provide reference points for a participant viewing the user interface 615C. In the embodiment illustrated by FIG. 8, the reference points comprise an ellipse 830 representing the two-dimensional ("2D") plane surrounding the remote speakerphone system 105. The additional graphical elements further comprise markers 835 indicating the ends of a conference table.

The angle indicator 810A, 810B conveys the position of an active speaker relative to the remote speakerphone system 105 in a 2D plane. The azimuth indicator 805A, 805B conveys the height above the reference plane 830 from which the speech of the speaker originates. The azimuth linker 815A, 815B serves to make clear which azimuth indicator 805A, 805B corresponds to a particular angle indicator 810A, 810B. At the intersection of the azimuth indicator 805A, 805B and the azimuth linker 815A, 815B, a speaker indicator 820, 825 is presented to represent a remote participant's position in 3D. The speaker indicator 820, 825 may change colors or brightness when a different participant begins to speak. For example, as shown in FIG. 8, the speaker indicator 825 is solid, while the speaker indicator 820 is not, reflecting that the speaker positioned at the location of speaker indicator 825 is the active speaker. In another embodiment, the speaker indicator 820, 825 corresponding to the active speaker blinks or fluctuates in color in response to periods of speech and silence during the time a corresponding remote participant remains the active speaker.

In one embodiment, dimensional information regarding a remote speaker is also displayed as part of user interface 615C. Dimensional information includes a distance from the remote speakerphone system 105 or a height above or below the remote speakerphone system 105. Angle information such as the angle between an angle indicator 810 and a reference line within a 2D plane or the angle between an azimuth indicator 805 and a 2D plane are also included in such dimensional information. Such dimensional information may be presented alongside the angle indicator 810 or alongside the azimuth indicator 805 or at any other suitable location within the user interface 615C.

In the embodiment illustrated by FIG. 8, two remote participants are present, a first represented by speaker indicator 820 and speaker indicator 825. Other embodiments may include any number of participants within the capabilities of the beam-forming microphone array 315 of a speakerphone system 105. In one embodiment, two remote participants may be depicted because the remote speakerphone system 105 has detected that two remote participants are present. The user interface 615C may have been configured with two remote participants as a result of actions taken by the auto-detection module 505 and the position display module 525.

In one embodiment, the identifier 610B is displayed near the active speaker indicator 820. The identifier 610B comprises an icon, image or textual message by which the identity of an active speaker is conveyed. The identifier 610A or 610B may be automatically determined by the speakerphone system 105 or may be based on information provide by participants of the call.

A modification to the user interface 615C shown in FIG. 8, is a user interface (not shown) that depicts an auditorium with rows of people or seats, each at a higher level. The user interface 615C takes advantage of 3D position information provided by the present invention to specify the location of an active speaker among numerous people displayed in the user interface. For example, the user interface 615C shown in FIG. 8 can be overlaid upon a graphic representation of an auditorium or even a captured image—still or live—of the actual auditorium. Dimensional information such as a distance from the remote speakerphone system 105, a height above or below the remote speakerphone system 105, angle information such as the angle between an angle indicator 810 and the reference line within a 2D plane, and the angle between an azimuth indicator 805 and a 2D plane are overlaid on the auditorium background. In a second more simplified interface, the seat of the active speaker is highlighted in the user interface depicting an auditorium with seats. Furthermore, the present invention may also use the position information to modify the audio signal sent to the listening speakerphone system 105A. The distance information is useful in situations such as auditoriums where the distance of the speaker from the microphone can vary greatly. In addition to highlighting the speaker on the user interface representing a picture of the auditorium, speakerphone system 105A adjusts the volume of the audio based on speaker position. For example, the more distant the speaker is, the more the volume is adjusted. Using speaker identification of the present invention, the system effectively "gives the floor" to a particular speaker, and treats any other competing speaker as "noise" and thus reduces their volume. This is very useful when people get excited, applaud or all start to talk (around a table in particular). If a particular speaker is the leader of the session (as identified by position), then the present invention accentuates that speaker so those on the far end hear that speaker better.

Figure 9:
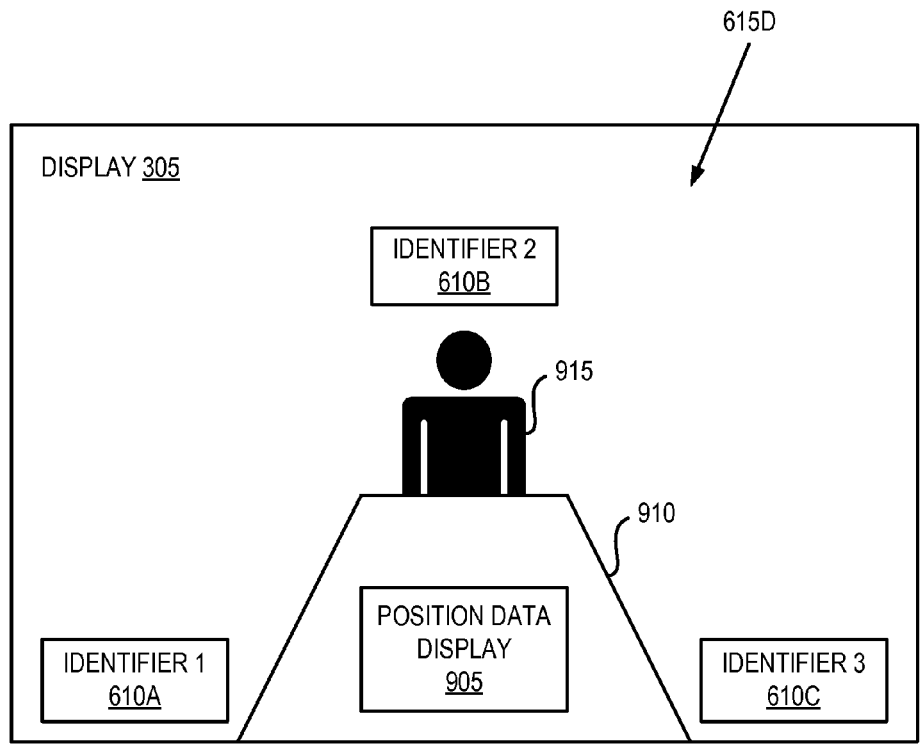
FIG. 9 is a graphical representation of a fourth embodiment of a user interface showing position information in accordance with the present invention.

Referring now to FIG. 9, a fourth sample user interface 615D as presented on the display 305 is illustrated. The user interface 615D conveys the position of a remote active speaker in 3D space and provides a perspective view of a representation of the remote location. When acoustic inputs are received by the beam-forming microphone array 315, the position processing module 425 determines the distance and direction from which the acoustic inputs originated and place the position of the remote active speaker in 3D. The user interface 615D presents a perspective view from the vantage point of the remote speakerphone system 105.

In one embodiment of the user interface 615D, a live or stored image of the current or most recent remote active speaker may be presented in the position where the participant 915 would appear from the vantage point of a remote speakerphone system 105. Those skilled in the art will recognize that the images as described throughout this application may be either still images, recorded video images or live video images. When the status of active speaker shifts to other remote participants (not shown), the view provide by the user interface 615D rotates so as to be directed towards the new active speaker. A perspective graphic 910 (e.g., a graphic mimicking the appearance of a conference table at which the active speaker is seated) is included to illustrate the 3D nature of the user interface 615D. Additionally, a user interface 615D may include dimensional information regarding the remote active speaker. Dimensional information may be displayed within a position data display 905 and include a distance from the remote speakerphone system 105 or a height above or below the remote speakerphone system 105 corresponding to the remote active speaker's position.

In one embodiment, the identifier 610A-610C is displayed in or near the position corresponding to its remote active speaker. The identifier 610A-610C comprises an icon, image or textual message by which the identity of an active speaker is conveyed. The identifier 610 may be automatically determined by the speakerphone system 105 or may be based on information provided by participants of a call. In one embodiment, participants may identity themselves and their positions to the speakerphone system 105 before or during a call. In one embodiment, identifiers 610 also are shown within a user interface 615D to indicate which call participants may be flanking the active speaker.

FIGS. 6-9 depict samples position displays 615 designed to indicate the position and/or identity of one remote active speaker during a conference call based on position information obtained by a remote speakerphone system 105. The embodiments illustrated within FIGS. 6-9 are presented for purely illustrative purposes and are not intended to be limiting. Other interfaces including the attributes described above are within the spirit and scope of the present invention.

Figure 10:
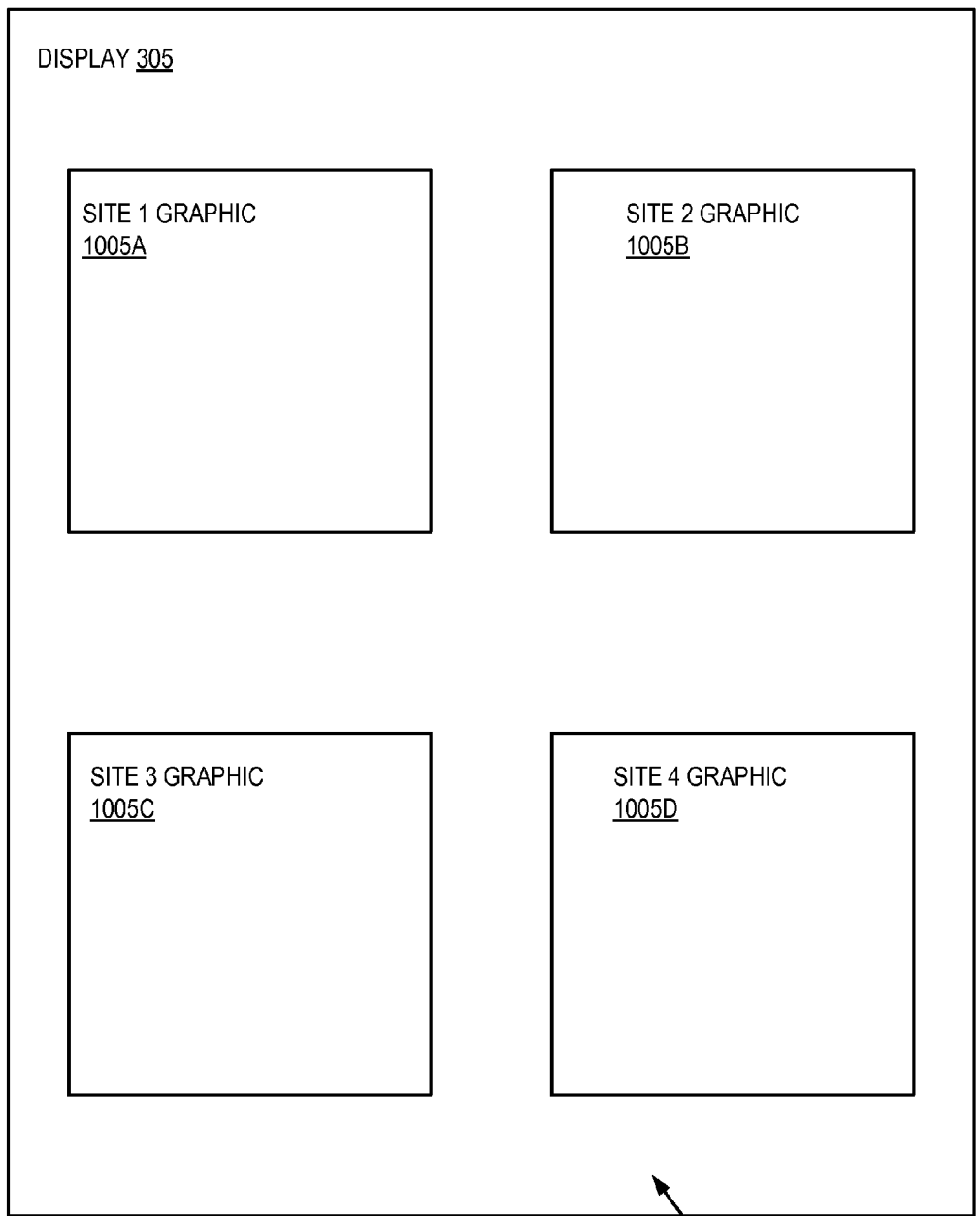
FIG. 10 is a graphical representation of a fifth embodiment of a user interface showing position information for multiple locations in accordance with the present invention.

Referring now to FIG. 10, a user interface 615E is illustrated that shows speaker position at multiple remote sites. In one embodiment, the user interface 615E includes a plurality of windows each having site graphics 1005A-1005D. The site graphics 1005A-1005D are presented simultaneously within a single user interface 615E. A site graphic 1005 comprises any of the position displays 615A-F depicted within FIGS. 6-9 or any variations thereof. For an example embodiment, site 1 1005A presents user interface 615A, while site 1 1005B presents user interface 615B. Those skilled in the art will recognize the user interfaces may be mixed, set by default or even set to be user selectable. In another embodiment, a user can use the input device 310 to select one or more site graphics 1005 to be visible at any time.

Figure 12A:
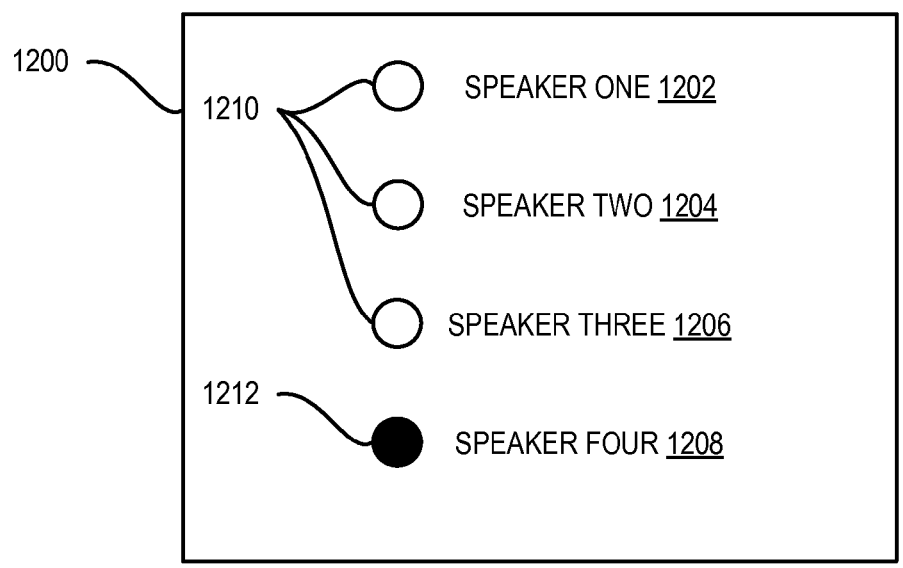
FIGS. 12A and 12B are graphical representations of simplified user interfaces showing position information in accordance with the present invention.
Figure 12B:
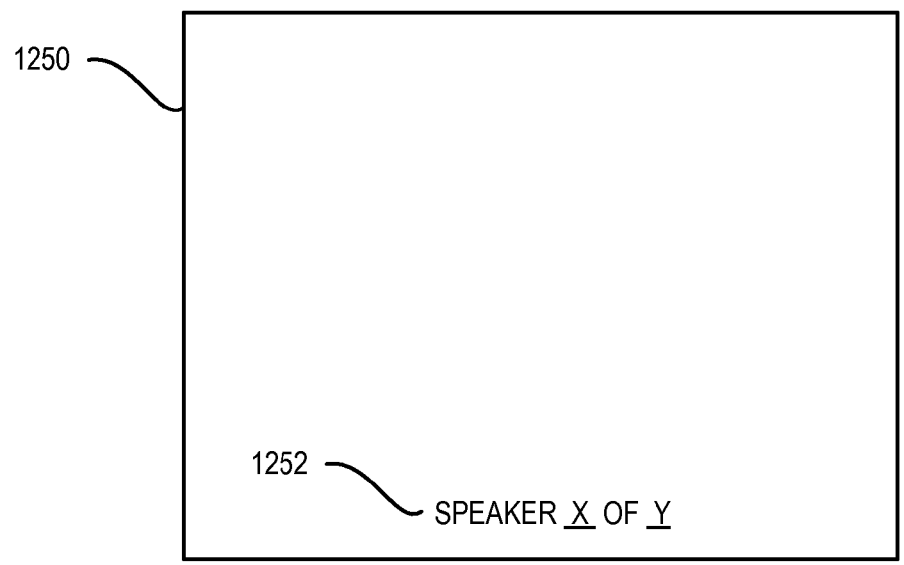

Referring now to FIGS. 12A and 12B, simple interfaces to provide positional information such on low-cost or legacy telephony end points are shown. FIG. 12A depicts a panel 1200 for a phone including series of light emitting diodes (LEDs) 1210, 1212 with corresponding speaker information 1202, 1204, 1206 and 1208. When a particular speaker is active a corresponding LED 1212 is activated. Depending on the speaker that is active, the corresponding LED 1210, 1212 in the same row will be activated. Similarly, FIG. 12B shows another interface to provide positional information for low-cost or legacy telephony end points. FIG. 12B shows a display panel with a message indicating a speaker number (x) from a total number of speakers (y) at the remote site. For example, the panel simply displays text such as "speaker 1 of 5", "speaker 2 of 5", etc. Those skilled in the art will recognize from the interfaces of FIGS. 12A and 12B that most any endpoint can be used to provide speaker identification information.

Call Management Interface

Figure 11:
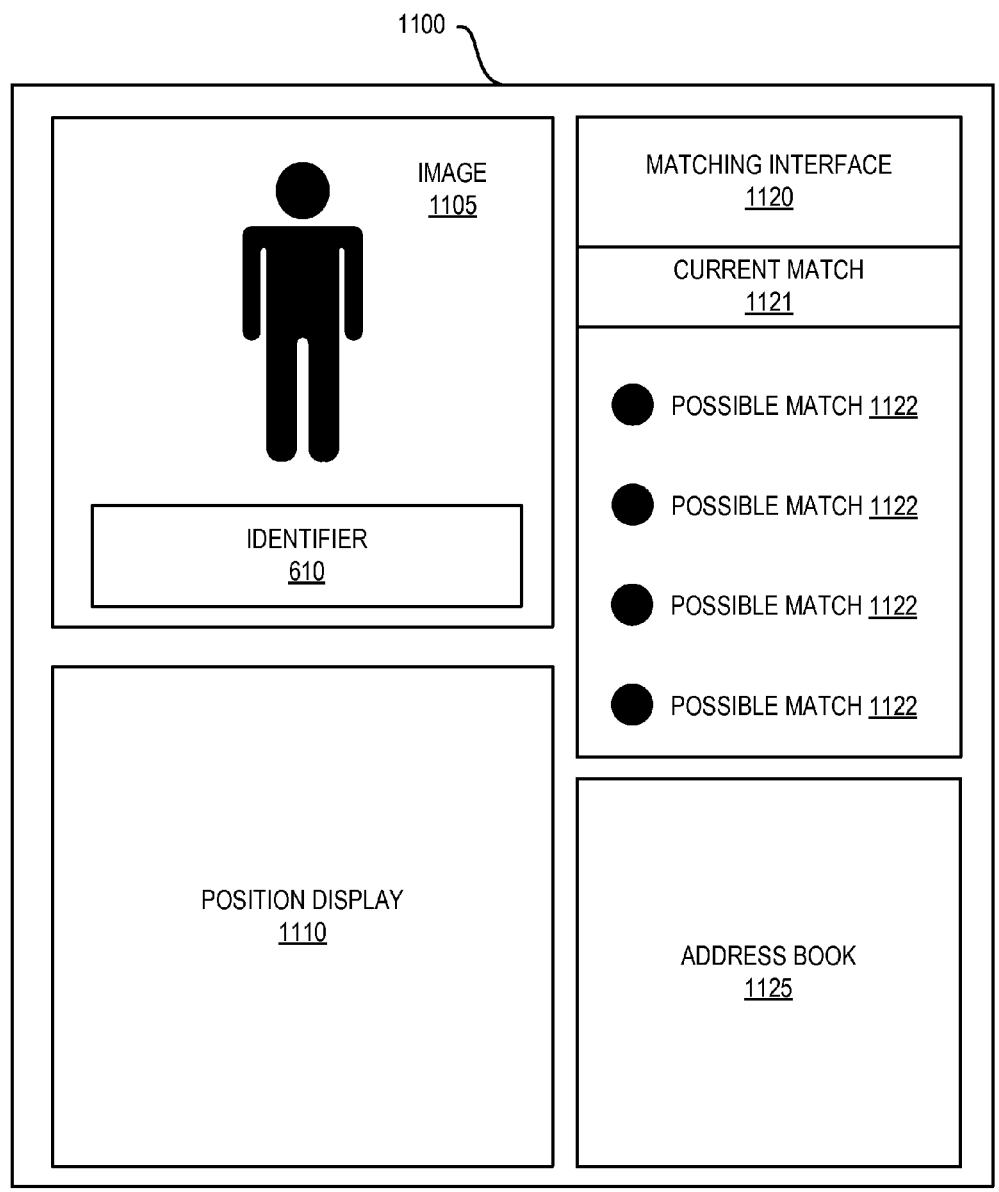
FIG. 11 is a graphical representation of a sixth embodiment of a user interface showing position information in accordance with the present invention.

Referring now to FIG. 11, one embodiment for a call management interface 1100 is shown. The call management interface 1100 is a graphical user interface generated and presented by a software application. The call management interface 1100 includes numerous viewing panes to enhance a call participant's ability to identify a remote active speaker and perform other functions during the call.

In one embodiment, the call management interface 1100 includes a window 1110 to convey the physical position of a remote active speaker. The window 1110 is used to present any of the position interfaces 615A-615E described above with reference to within reference to FIGS. 6-10 or any variations thereof. In another embodiment, a user may have the ability to configure the window 1110 as desired by interacting with the call management interface 1100 using an input device 310. For example, a user may select which of the position displays 615A-615E depicted within FIGS. 6-10 is employed, select a color scheme for the user interface 615A-615E, or adjust the on-screen size of the user interface 615A-615E (e.g., cause a position display to be "full-screen" and occupy the entire area of the display 305.

In one embodiment, the call management interface 1100 includes a live or stored image 1105 of a remote active speaker. The live image 1105 is obtained from a webcam included in or communicatively to a remote speakerphone system 105. The stored image 1105 is retrieved from the system storage module 430 within a speakerphone system 105 or may be retrieved from an external computer readable storage medium communicatively coupled to the speakerphone system 105. A user may have the ability to choose between using a live or a stored image 1105 and may additionally have the ability to designate which of a plurality of possible stored images 1105 is used for a particular active speaker.

In one embodiment, the identifier 610 is displayed as a complement to the image 1105. The identifier 610 comprises an icon, image or textual message by which the identity of an active speaker is conveyed. In one embodiment, the call management interface 1100 includes a matching interface 1120 to aid a user in identifying a remote active speaker. The speakerphone system 105 attempts to automatically identify the remote active speaker, but may occasionally do so inaccurately. In one embodiment, a current match 1121 corresponding to the identity automatically selected as most likely to correspond to the remote active speaker is presented to a user. The current match 1121 is additionally reflected in the image 1105, identifier 610 or both. The speakerphone system 105 presents one or more possible matches 1122 that it has automatically determined as likely to correspond to the remote active speaker. Should the current match 1121 be incorrect, a user may recognize that the remote active speaker corresponds to one of the possible matches 1122 and indicate that to the call management interface 1100 using an input device 310.

In one embodiment, the personal call management interface 1100 also includes an address book interface 1125 to access business or personal contacts. Should neither the current match 1121 nor any of the possible matches 1122 correspond to the remote active speaker, but the user knows the proper identity of the remote speaker, the user may identify the remote active speaker using the address book interface 1125. Additionally, the user may use the address book interface 1125 to initiate a conference call by selecting participants from the stored contacts. Those skilled in the art will recognize that the present invention may be adapted to retrieve the stored contact from any location such as an address book, a database, the telephony system, a personal information system, etc.

In yet another embodiment, the position processing module 425 and its functionality may be used not only when on a call as described above, but also when the user or particular extension is not on a call. Often a user wants to know where someone is, and what they might be doing before placing a call, or text messaging, or instant messaging, or emailing. For example, the position processing module 425 may be activated at most of the time to provide presence information to a telephony system 90 about a particular office in which the speakerphone system 105A resides or is positioned, independent of whether there is an active call. The present invention is able to augment presence information which is very useful. Prior art systems were able to provide only the most rudimentary telephony presence information such as whether the person (actually the extension) is on the phone (in use) or not. Some prior art instant messaging systems show if the user is active on a keyboard or mouse, or the user has manually set presence to a particular state, such as do not disturb. However, the present invention is able to provide augmented presence information. In particular, the present invention uses the microphone 315, the position processing module 425 and voice recognition (not shown) to listen in when the user is NOT on a call, and provide augmented presence information such as "present, speaking and on the phone," "present, speaking, but not on the phone," "present, not speaking, not on the phone," etc., The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A graphical user interface comprising:
a call management display area including a plurality of partitions, the plurality of partitions dynamically adjusted based in part on a number of speakers, each partition corresponding to a position around a phone system, the call management display conveying a position of an active speaker in a three-dimensional representation, the three-dimensional representation including information depicting a distance from the phone system;
at least one identifier, each identifier corresponding to a partition of the plurality of partitions; and
at least one position indicator icon, each position indicator icon corresponding to a corresponding identifier of the at least one identifier, the position indicator icon showing the active speaker based on received acoustic signals indicating the position of the active speaker.

2. The graphical user interface of claim 1, wherein the at least one identifier includes a live or stored image corresponding to an identity of a speaker.

3. The graphical user interface of claim 1, wherein the call management display area is represented by a circular area and each partition of the plurality of partitions is represented by a portion of the circular area.

4. The graphical user interface of claim 1, wherein the call management interface comprises a list of identities, the identities ranked based on a likelihood that they correspond to an identified speaker.

5. The graphical user interface of claim 1, wherein the three-dimensional representation includes at least one of the information depicting the distance from the phone system and information depicting height above the phone system.

6. The graphical user interface of claim 1, further including, presenting, on the call management interface, an on-screen position of the position indicator icon corresponding to a determined position of the active speaker.

7. The graphical user interface of claim 1, wherein the call management interface includes a separate window to depict the position of the active speaker.

8. A method comprising:
providing a user interface for display, the user interface including:
 a call management display area including a plurality of partitions, the plurality of partitions dynamically adjusted based in part on a number of speakers, each partition corresponding to a position around a phone system, the call management display conveying a position of an active speaker in a three-dimensional representation, the three-dimensional representation including information depicting a distance from the phone system;
 at least one identifier, each identifier corresponding to a partition of the plurality of partitions; and
 at least one position indicator icon, each position indicator icon corresponding to a corresponding identifier of the at least one identifier, the position indicator icon showing the active speaker based on received acoustic signals indicating the position of the active speaker.

9. The method of claim 8, wherein the identifier includes a live or stored mage corresponding to the identity of a speaker.

10. The method of claim 8, wherein the call management display area is represented by a circular area and each partition of the plurality of partitions is represented by a portion of the circular area.

11. The method of claim 8, wherein the call management interface comprises a list of identities, the identities ranked based on a likelihood that they correspond to an identified speaker.

12. The method of claim 8, wherein the three-dimensional representation includes at least one of the information depicting the distance from the phone system and information depicting height above the phone system.

13. The method of claim 8, further including, presenting, on the call management display area, an on-screen position of the position indicator icon corresponding to a determined position of the active speaker.

14. The method of claim 8, wherein the call management display area includes a separate window to depict the position of the active speaker.

15. A system, comprising;
one or more processors;
one or more memories storing instructions that, when executed by the one or more processors, cause the system to:
 provide a user interface for display, the user interface including:
  a call management display area including a plurality of partitions, the plurality of partitions dynamically adjusted based in part on a number of speakers, each partition corresponding to a position around a phone system, the call management conveying a position of an active speaker in a three-dimensional representation, the three-dimensional representation including information depicting a distance from the phone system;
  at least one identifier, each identifier corresponding to a partition of the plurality of partitions; and
  at least one position indicator icon, each position indicator icon corresponding to a corresponding identifier of the at least one identifier, the position indicator icon showing the active speaker based on received acoustic signals indicating the position of the active speaker.

16. The system of claim 15, wherein the at least one identifier includes a live or stored mage corresponding to an identity of a speaker.

17. The system of claim 15, wherein the call management display area is represented by a circular area and each partition of the plurality of partitions is represented by a portion of the circular area.

18. The system of claim 15, wherein the call management interface comprises a list of identities, the identities ranked based on a likelihood that they correspond to an identified speaker.

19. The system of claim 15, wherein the three-dimensional representation includes at least one of the information depicting the distance from the phone system and information depicting height above the phone system.

20. The system of claim 15, further including, presenting, on the call management display area, an on-screen position of the position indicator icon corresponding to a determined position of the active speaker.

21. The system of claim 15, wherein the call management display area includes a separate window to depict the position of the active speaker.

22. A method for displaying speaker position comprising:
receiving acoustic signals data from a plurality of speakers in a surrounding environment indicating physical positions of the plurality of speakers associated with a phone system;
determining a plurality of partitions, the plurality of partitions dynamically adjusted based on the received acoustic signals data from the plurality of speakers and each partition corresponding to a position around the phone system;
generating at least one identifier, each identifier corresponding to a partition of the plurality of partitions;
generating at least one position indicator icon, each of the at least one position indicator icons corresponding to a corresponding identifier of the at least one identifier; and
providing for display a call management display area including the plurality of partitions and conveying the position of the active speaker in a three-dimensional representation, the three-dimensional representation including information depicting a distance from the phone system, the at least one position indicator icon, the at least one position indicator icon showing an active speaker based on received acoustic signals indicating the position of the active speaker, and at least one identifier, each identifier corresponding to a partition of the plurality of partitions.

* * * * *